United States Patent
Andersson et al.

(10) Patent No.: US 7,802,843 B2
(45) Date of Patent: Sep. 28, 2010

(54) FLEXIBLE NOISE COVER FOR A VENTILATED SEAT

(75) Inventors: Christer Andersson, Trollhättan (SE); Torbjörn Andersson, Trollhättan (SE); Hans Kesselman, Uddevalla (SE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/190,992

(22) Filed: Aug. 13, 2008

(65) Prior Publication Data

US 2010/0038937 A1    Feb. 18, 2010

(51) Int. Cl.
A47C 31/00 (2006.01)
(52) U.S. Cl. .................................. 297/180.14
(58) Field of Classification Search ............ 297/452.47, 297/452.46, 180.14, 180.13, 180.1, 180.16; 181/292, 211, 198, 224, 225; 415/119
See application file for complete search history.

(56) References Cited

U.S. PATENT DOCUMENTS

| | | | |
|---|---|---|---|
| 4,847,933 A * | 7/1989 | Bedford | 5/652.2 |
| 6,196,627 B1 | 3/2001 | Faust et al. | |
| 6,224,150 B1 * | 5/2001 | Eksin et al. | 297/180.1 |
| 6,676,207 B2 * | 1/2004 | Rauh et al. | 297/180.14 |
| 6,682,140 B2 | 1/2004 | Minuth et al. | |
| 6,848,742 B1 * | 2/2005 | Aoki et al. | 297/180.14 |
| 6,976,734 B2 | 12/2005 | Stoewe | |
| 7,100,978 B2 | 9/2006 | Ekern et al. | |
| 7,213,876 B2 | 5/2007 | Stoewe | |
| 2007/0176471 A1 * | 8/2007 | Knoll | 297/180.14 |

* cited by examiner

*Primary Examiner*—Milton Nelson, Jr.
(74) *Attorney, Agent, or Firm*—MacMillan, Sobanski & Todd, LLC

(57) ABSTRACT

This invention relates to a vehicle seat assembly having a lower seat assembly and a seat back assembly, the lower seat and seat back assemblies having an exterior surface and an interior region. The vehicle seat includes a ventilation system configured to move air through body-side openings in the exterior surface, the ventilation system comprising a fan and one or more fan openings, the fan openings providing fluid communication between the fan and an exterior of the seat assembly through the exterior surface. The vehicle seat also includes a flexible noise cover, mounted on the vehicle seat assembly, defining the fan openings.

20 Claims, 4 Drawing Sheets

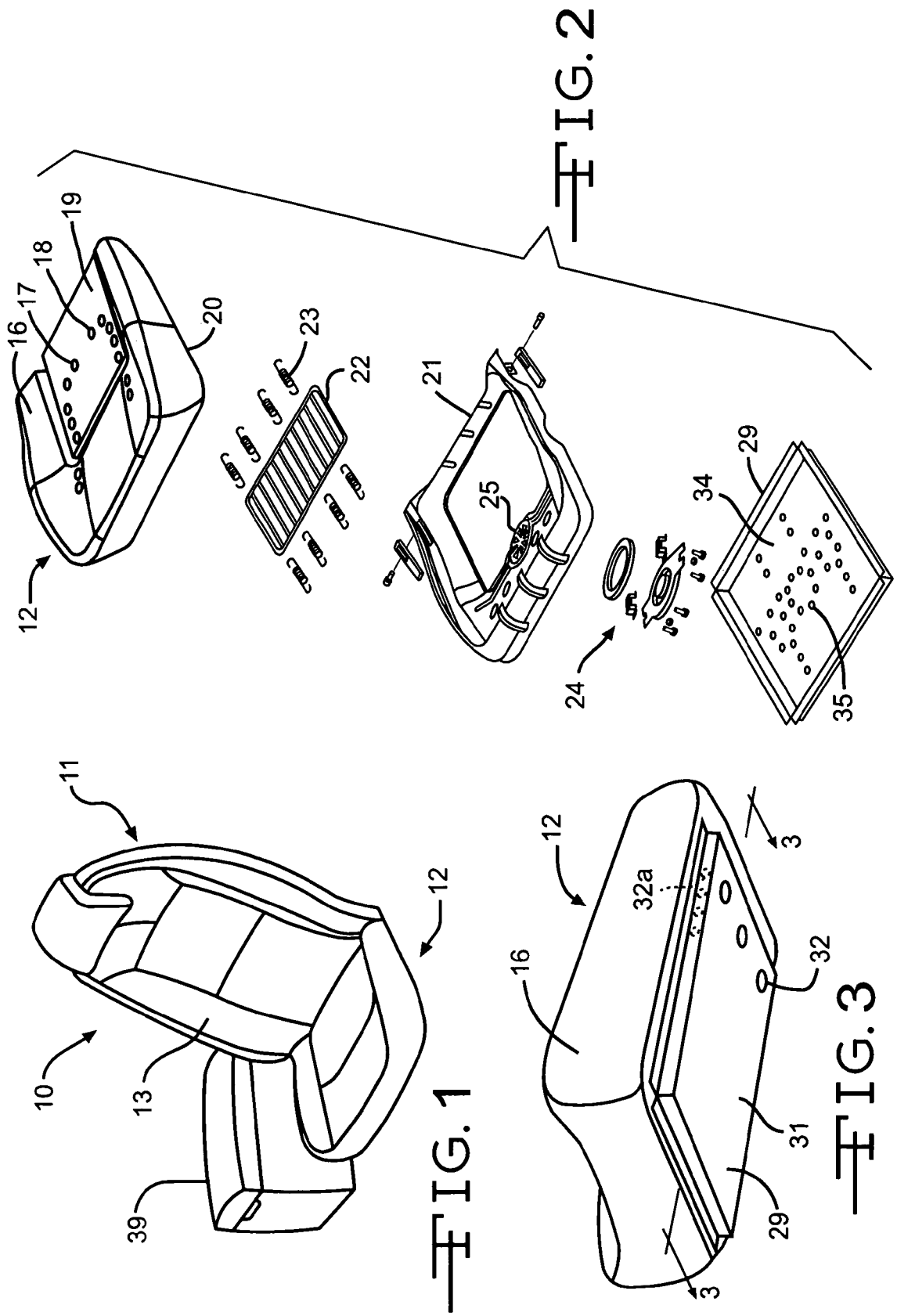

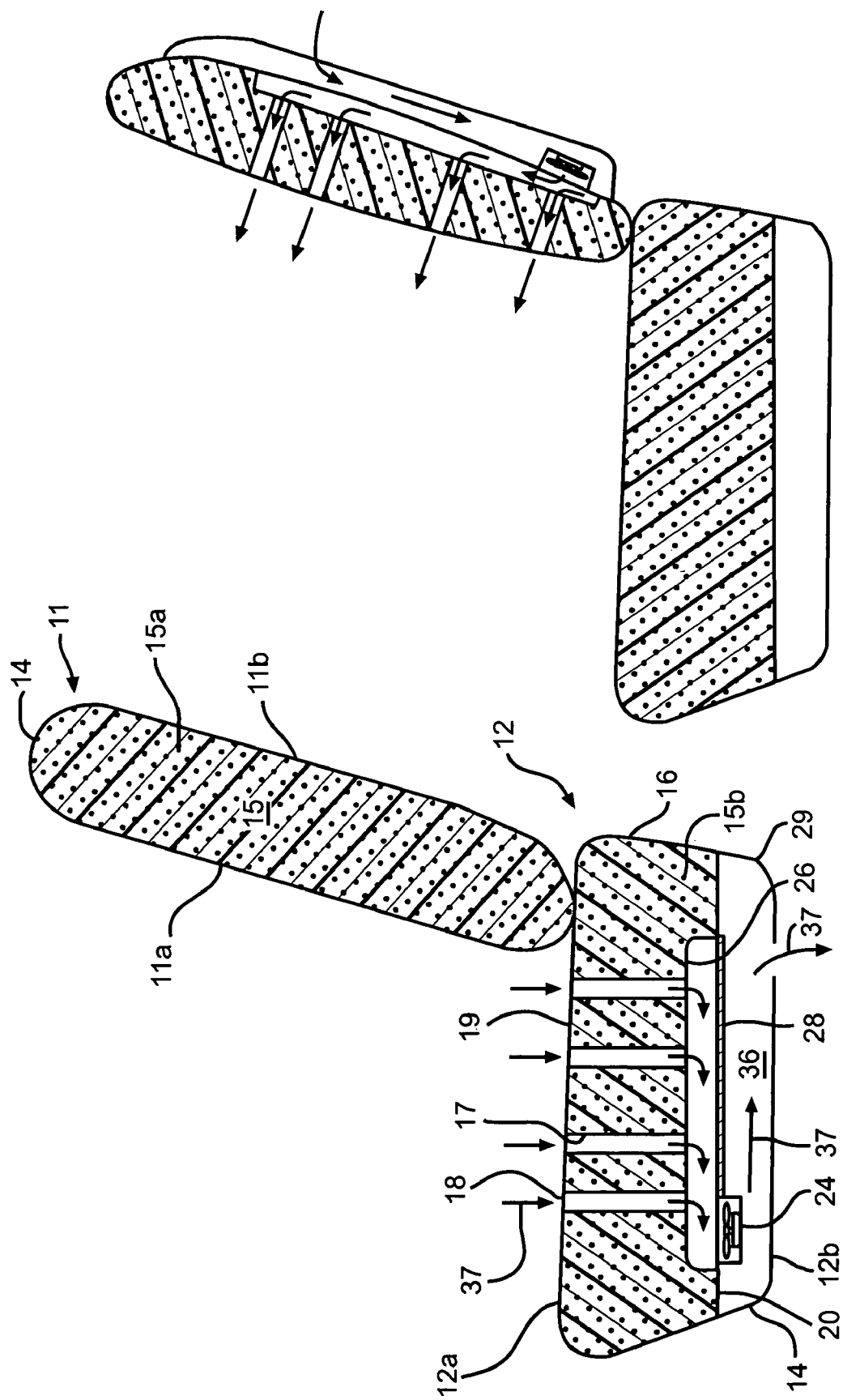

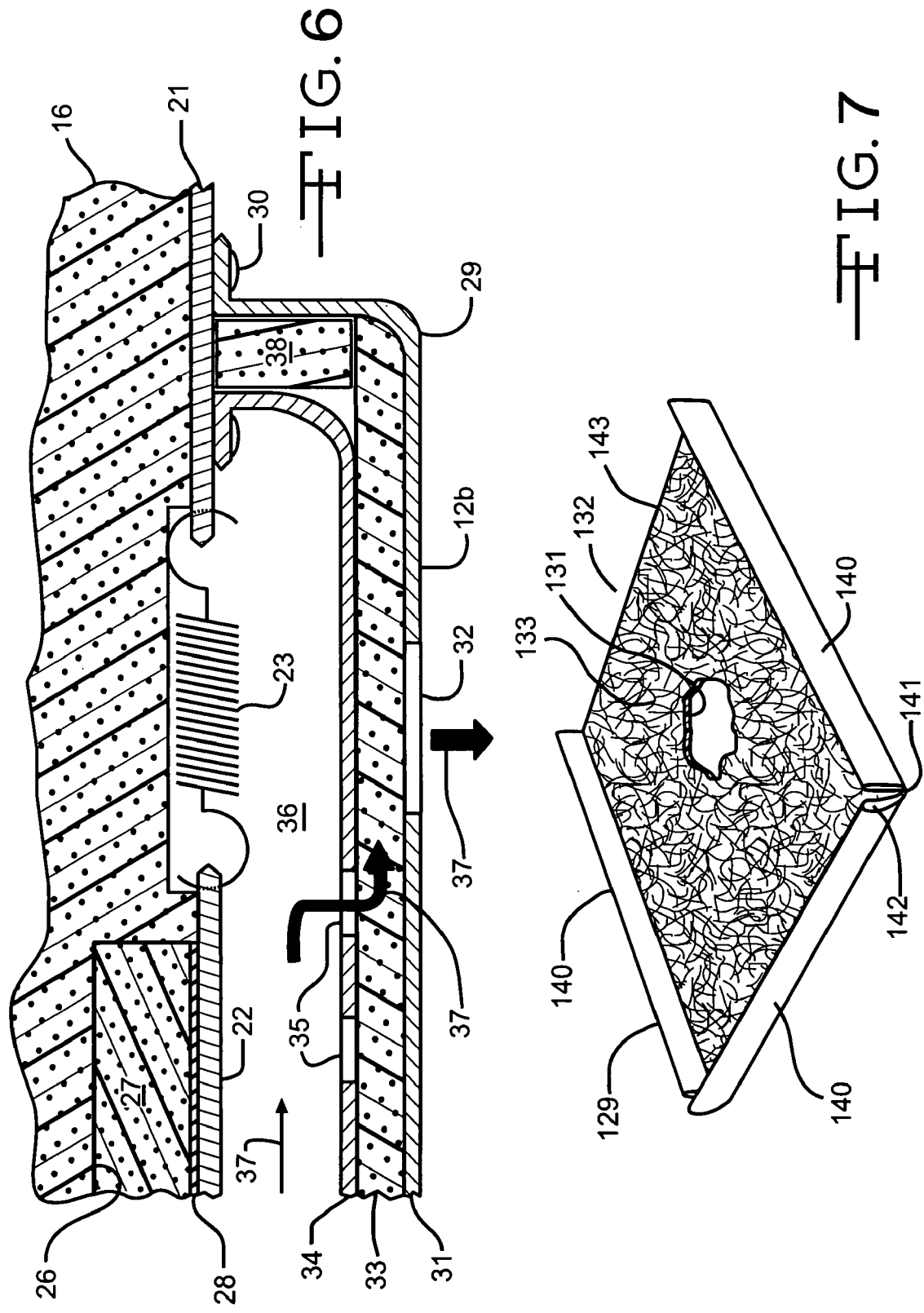

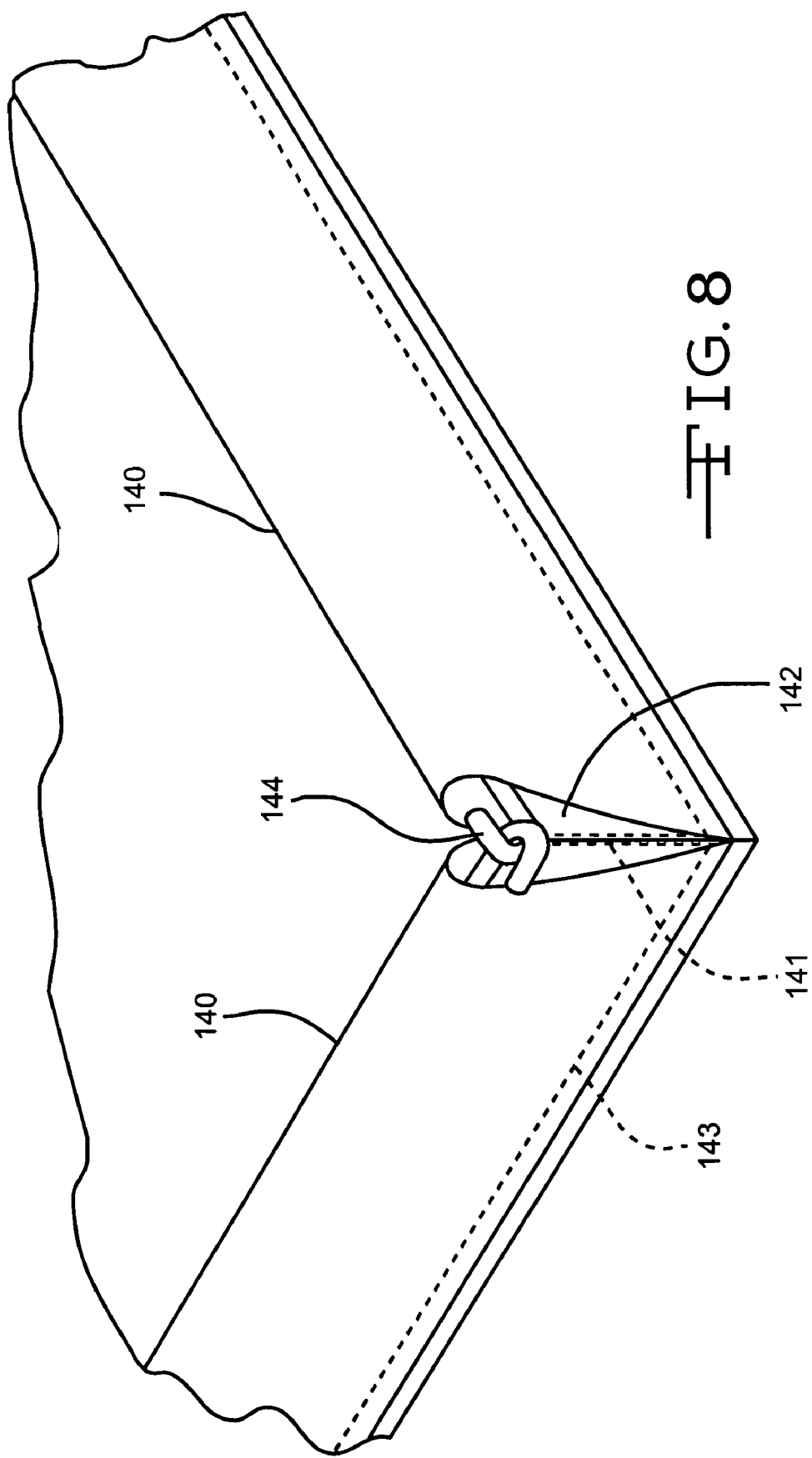

FLEXIBLE NOISE COVER FOR A VENTILATED SEAT

BACKGROUND OF THE INVENTION

This invention relates in general to a vehicle seat and, more particularly, concerns a vehicle seat having an associated air-handling device connected to an air distribution system in the seat.

Motor vehicles usually have seats for the driver and any passengers. Vehicle seats are known to include a rigid frame that supports a generally horizontal lower seat assembly and a generally vertical seat back assembly. The lower seat assembly and seat back assembly are often adjustable within a range of angles and spacing, relative to the other parts of the vehicle, in order to accommodate occupants of a variety of body sizes. This adjustability also allows the occupant to sit in a comfortable position. Both the lower seat assembly and seat back assembly are often cushioned with foam pads in order to make the occupant comfortable.

Some vehicle seats include climate control systems. These climate control systems allow the seat occupant to be made more comfortable. One type of climate controlled vehicle seat is the ventilated seat. Ventilated seats often use fans combined with channels in the foam pads to move air past the occupant or into contact with the occupant. The upholstery of a ventilated seat is either made of a fabric that air can flow through, or it is made of a material, such as leather, that is perforated in order to allow air flow.

The fans in a ventilated seat typically have inlets or outlets that are in communication with the passenger compartment of the vehicle. This allows the fans to move air from the passenger compartment through the foam pads of the seat. Ventilated seats are known to be made for pushing air as well as for pulling air. In a typical pushing air system, the fan forces air into channels in the foam pad, and out through the upholstery layer. In a typical pulling air system, the fan draws air into the seat through the upholstery, through channels in the foam pad, and the air is expelled from the seat.

The fans in the ventilated seat, while operating to move air, also create noise. This noise can be transferred to the passenger compartment of the vehicle through the same pathways used for moving air from the passenger compartment. The noise created by the fans in the ventilated seats is undesirable. It would be desirable to reduce the noise in ventilated seat assemblies.

SUMMARY OF THE INVENTION

This invention relates to a vehicle seat assembly having a lower seat assembly and a seat back assembly, the lower seat and seat back assemblies having an exterior surface and an interior region. The vehicle seat includes a ventilation system configured to move air through body-side openings in the exterior surface, the ventilation system comprising a fan and one or more fan openings, the fan openings providing fluid communication between the fan and an exterior of the seat assembly through the exterior surface. The vehicle seat also includes a flexible noise cover, mounted on the vehicle seat assembly, defining the fan openings.

Various aspects of this invention will become apparent to those skilled in the art from the following detailed description of the preferred embodiment, when read in light of the accompanying drawings.

BRIEF DESCRIPTION OF THE DRAWINGS

FIG. 1 is a perspective view of a ventilated vehicle seat utilizing a noise cover of one embodiment of the invention.

FIG. 2 is an exploded, perspective view of the lower seat assembly of the seat of FIG. 1.

FIG. 3 is an upward perspective view of the lower seat assembly of the seat of FIG. 1.

FIG. 4 is a schematic cross-section of a ventilated vehicle seat including a noise cover of the first embodiment of the invention.

FIG. 5 is a schematic cross-section of a ventilated vehicle seat including a noise cover of a second embodiment of the invention.

FIG. 6 is a cross section of a portion of the noise cover of FIG. 3, taken along the line 3-3.

FIG. 7 is a perspective view, partially cut-away, of a third embodiment of a noise cover.

FIG. 8 is a perspective view of the corner of the noise cover from FIG. 7.

DETAILED DESCRIPTION OF THE PREFERRED EMBODIMENT

Referring now to the drawings, there is illustrated in FIG. 1 a ventilated vehicle seat 10. The ventilated vehicle seat 10 is suitable for use in the passenger compartment of a car or other vehicle. The ventilated vehicle seat 10 includes a seat back assembly, indicated generally at 11, and a lower seat assembly, indicated generally at 12. An upholstery layer 13 covers a front side of the seat back assembly 11 and the upper exterior surface of the lower seat assembly 12. As shown in FIG. 4, the seat back assembly 11 has a front exterior surface 11a and a rear exterior surface 11b. The front exterior surface 11a and rear exterior surface 11b enclose a back interior region 15a. The lower seat assembly has a top exterior surface 12a and a bottom exterior surface 12b. The top exterior surface 12a and bottom exterior surface 12b enclose a lower interior region 15b. The combination of the front exterior surface 11a, rear exterior surface 11b, top exterior surface 12a and bottom exterior surface 12b is the seat exterior surface 14. The combination of the back interior region 15a and the lower interior region 15b is the seat interior region 15.

Referring now to FIG. 2, an exploded view of the lower seat assembly 12 of FIG. 1 is shown with the upholstery layer 13 removed. The lower seat assembly 12 includes a lower foam cushion 16. The lower foam cushion 16 includes a plurality of air channels 17 formed therethrough. The upper end of the air channels 17 are body-side openings 18. The air channels 17 provide fluid communication between the top surface 19 of the lower foam cushion 16 and the bottom surface 20. The top surface 19 is the surface on which an occupant of the ventilated seat 10 will be seated. The body-side openings 18 are the openings through the top exterior surface 12a which are disposed toward the occupant of the ventilated seat 10. The body-side openings 18 are one point at which air moving through the ventilated seat 10 passes through the seat exterior surface 14 and either into or out of the seat interior region 15.

The illustrated lower foam cushion 16 is secured atop a seat pan assembly 21. The illustrated seat pan assembly 21 is a steel component, although other materials can be used. A spring net 22 is supported by a plurality of springs 23 across the pan assembly 21 for supporting the lower foam cushion 16. A fan assembly 24 is secured to the pan opening 25 on the pan assembly 21. Although FIG. 2 illustrates one embodiment of a lower seat assembly 12, the invention can be used with seat assemblies having different components or configurations.

A noise cover 29 is attached to the lower seat assembly 11 below the fan assembly 24. The noise cover 29 will be discussed in detail below.

As shown in FIG. 4, a bottom flow channel 26 is formed along the bottom surface 20 of the lower foam cushion 16. The bottom flow channel 26 is an open space in the material of the lower foam cushion 16. Bottom flow channel 26 provides fluid communication between the fan assembly 24 and the air channels 17. This provides fluid communication between the fan assembly 24 and the body-side openings 18.

In the illustrated embodiment, the bottom flow channel 26 contains a porous cushion member 27, shown in FIG. 6. Porous cushion member 27 provides support for lower foam cushion 16, and helps prevent collapse and obstruction of bottom flow channel 26 when weight is applied to the lower foam cushion 16. Porous cushion member 27 is not required, and the configuration of bottom flow channel 26 is not important to the invention. Bottom flow channel 26 can be empty, or can be multiple air-permeable passages. Bottom flow channel 26 could also be omitted from the lower foam cushion 16, and the air channels 17 could be in direct communication with the fan assembly 24.

An isolation layer 28 is disposed below bottom flow channel 26. Isolation layer 28 helps direct air flow from the bottom flow channel 26 either through the air channels 17, or through the fan assembly 24. In the illustrated embodiment, isolation layer 28 is a thin polyurethane sheet; however, isolation layer 28 may be any sort of air impermeable material.

As shown in FIGS. 2 and 3, noise cover 29 is attached to the lower seat assembly below the fan assembly 24. Noise cover 29 can be attached to the lower seat assembly 12 using clips 30, as shown in FIG. 6, or by sewing, cable tie, hog rings, J-strips, glue, double sided tape, or other suitable methods. The noise cover 29 provides acoustic insulation, reducing the level of fan assembly noise that is audible to the occupant of the ventilated vehicle seat 10. In the illustrated embodiment, noise cover 29 is made of flexible materials such as vinyl, textile, foam or fleece; however, this is not required and the noise cover could be made of rigid materials.

The flexible noise cover 29 is able to accommodate movements of the ventilated vehicle seat 10 caused, for example, by the shifting body weight of an occupant. The flexible noise cover 29 is also able to accommodate contact between the noise cover 29 and other vehicle components such as the vehicle floor. The flexible noise cover 29 is able to deform around parts that would otherwise interfere with installation of the noise cover. The flexible noise cover 29 is also able to deform around parts that would otherwise be interfered with by a rigid noise cover.

The flexible noise cover 29 provides several advantages over a noise cover made of rigid materials. The flexible noise cover 29 can be manufactured and installed at a lower cost than a rigid noise cover. The flexible noise cover 29 is able to deform and conform to the shape of other vehicle components. This allows the noise cover 29 to be used in locations with limited space available. This allows a single flexible noise cover to be used in a variety of different vehicles, or in vehicles with different interior configurations. The flexible noise cover 29 can be impinged upon by other objects, and still maintain a seal with the underside of the seat pan assembly 21. Also, the flexible noise cover 29 is less likely than rigid noise covers to rattle when in contact with other vehicle components.

As shown in FIG. 6, the illustrated flexible noise cover 29 is made of three layers of flexible material. Noise cover 29 includes a first relatively air impermeable layer 31, made of flexible, relatively air impermeable material such as vinyl, artificial leather or foil. The first relatively air impermeable layer 31 defines a plurality of fan openings 32. Fan openings 32 are openings through the bottom exterior surface 12b. Fan openings 32 are one location at which air moved through the ventilated seat 10 passes through the exterior surface 14 and either into or out of the seat interior region 15.

The noise cover 29 includes a relatively air permeable layer 33, made of textile, foam, fleece or some other flexible, relatively air-permeable material. One function of relatively air permeable layer 33 is to absorb sound generated by the fan assembly 24. This reduces the amount of fan assembly noise escaping into the passenger compartment of the vehicle.

The illustrated noise cover 29 further includes an optional barrier layer 34, made of flexible, relatively air impermeable material. The barrier layer 34 defines a plurality of second openings 35.

The noise cover 29 is attached to the bottom of the lower seat assembly 12, creating a gap 36. In the illustrated embodiment, the gap 36 exists between the noise cover 29 and the lower foam cushion 16.

In the embodiment shown, the total area of the fan openings 32 is at least the same size as the outlet of the fan assembly 24. In the embodiment shown, fan openings 32 have a total area of approximately seventeen square centimeters. This is not required, and the fan openings 32 can have a different total area, as well as having a total area different from that of the outlet of fan assembly 24.

As shown in FIG. 6, the fan openings 32 and the second openings 35 are not aligned with each other. As a result, air moved by the fan assembly 24 through the noise cover 29 has to travel through the relatively air permeable layer 33 in a direction that is substantially parallel to the bottom exterior surface 12b. In the embodiment shown, bottom exterior surface 12b of the vehicle seat assembly 10 is the lower surface of the first relatively air impermeable layer 31 of the noise cover 29.

In the embodiment shown, the fan assembly 24 is configured to operate in a pulling mode, as shown in FIG. 4. The path of air moved by the illustrated pulling system is indicated by arrows 37. In a pulling mode, air is drawn into the vehicle seat assembly 10 through the body-side openings 18, pulled through the air channels 17 and the bottom flow channel 26 to the fan assembly 24. The air is discharged from the fan assembly 24 into the gap 36. Referring now to FIG. 6, gap 36 is maintained at a positive pressure, and the air exits gap 36 through the second openings 35. The air travels through the relatively air permeable layer 33, and out of the vehicle seat assembly 10 through the fan openings 32.

In the illustrated embodiment, the second openings 35 and the fan openings 32 are not aligned with each other across the noise cover 29. That is, in order for air to move through the noise cover 29, it must travel laterally through the relatively air-permeable layer 33. A portion of the air path is parallel to the first relatively air impermeable layer 31, increasing the length of the path the air travels through the relatively air-permeable layer 33. By increasing the length of the travel path through the relatively air permeable layer 33, the opportunities of absorption and reflection of sound are increased. As a result, the noise cover 29 is better able to reduce the amount of sound from the fan assembly 24 that is audible to passengers.

The layers of the noise cover 29 are made of materials that are relatively air impermeable and relatively air permeable. The relatively air impermeable material does not have to be airtight. Materials are selected to encourage the air moving through the noise cover 29 to take the travel path described above.

As can be seen by reference to FIGS. 2 and 3, the illustrated noise cover 29 includes three fan openings 32 (shown in FIG. 3) and a larger number of smaller second openings 35 (shown in FIG. 2). This is not necessary, and alternative combinations and configurations of fan openings 32 and second openings 35 can be used. Second openings 35 can be arranged to align with fan openings 32. Alternatively, the barrier layer 34 can be arranged over fan openings 32 without extending laterally. That is, barrier layer 34 could be a foil applied to the top of relatively air permeable layer 33, no larger than the fan openings 32. Alternatively, the barrier layer 34 is an optional feature that could be left out of the noise cover 29.

Referring back to FIG. 6, spacers 38 are disposed around the perimeter of the noise cover 29. The spacers 38 are made of a relatively rigid material, and assist in maintaining a gap 36 between the noise cover 29 and the lower foam cushion 16. Spacers 38 are an optional component, and do not have to be included.

The fan assembly noise escaping the noise cover 29 can be further controlled by the positioning of the fan openings 32. The amount of sound audible to a passenger can be reduced by locating the fan openings 32 such that they are directed away from the passenger. In the embodiment shown, three fan openings 32 are shown on the lower surface of the first relatively air impermeable layer 31. Fan openings 32 can consist of a different number of openings, or of a single, larger opening defined by the first relatively air impermeable layer 31. Fan openings 32 can also be defined at a different location by the noise cover 29, such as 32a on FIG. 3. In an alternative embodiment, not shown, the fan openings are positioned near the side of the lower seat assembly 12 that is nearest the center console 39 of the vehicle.

FIGS. 7 and 8 illustrate an alternative noise cover 129. Alternative noise cover 129 differs from noise cover 29 in part in the location of the fan openings. Noise cover 29 defines three round fan openings 32 within the surface of the first relatively air impermeable layer 31. Alternative noise cover 129, however, defines a single, slit-shaped fan opening 132.

As illustrated, alternative noise cover 129 includes three attachment edges 140. The attachment edges 140 are folded upwards and sewn together along seam 141. The attachment edges 140 include sleeves 142. The sleeves 142 can be defined by folding the material of attachment edge 140 over and attaching it to the alternative noise cover 129, such as by stitching 143. Wires 144 are provided in sleeves 142 in order to provide additional rigidity to the structure of the alternative noise cover 129. In the illustrated embodiment, each attachment edge 140 includes a separate wire 144, and the wires 144 are hooked together where the attachment edges 140 meet at the seams 141. This is not required, and the alternative noise cover 129 could use a different configuration of wires, a different structural reinforcement, or not include any structural reinforcement.

The attachment edges 140 are attached to the lower seat assembly 12 below the fan assembly 24. Alternative noise cover 129 can be attached by sewing, using clips, cable tie, hog rings, J-strips, glue, double sided tape, or other suitable methods. Alternative noise cover 129 is attached to the lower seat assembly, similarly to the noise cover 29 shown in FIG. 6, such that there is a gap 36 between the alternative noise cover 129 and the lower foam cushion 16.

Alternative noise cover 129 includes a first relatively air impermeable layer 131 and a relatively air permeable layer 133. Relatively air permeable layer 133 absorbs sound generated by the fan assembly 24, and reduces the amount of sound escaping into the passenger compartment of the vehicle. The alternative noise cover 129 includes an unattached edge 143 that is not attached to the lower seat assembly 12. The fan opening 132 is defined by the space between the alternative noise cover 129 and the other components of the lower seat assembly 12. In the illustrated embodiment, the fan opening 132 exists across the whole width of the alternative noise cover 129. The fan opening 132 could extend across a greater or lesser portion of the alternative noise cover 129, or could consist of a number of smaller openings.

The described embodiments have described the fan assembly 24 operating in a pulling system. The noise cover of the invention can also be installed on a ventilated seat that uses a pushing system, as shown in FIG. 5. In a pushing system, air is drawn in through the fan openings and pushed out through the body-side openings. When used with a pushing system, the gap 36 would be at a negative pressure. Therefore, the noise cover may receive additional stiffness through seam and corner position, or may receive additional spacers or other support members such as wires to help prevent the noise cover from collapsing against the rest of the lower seat assembly.

The noise cover of the invention could also be used with a system that does not use body-side openings. The noise cover is compatible with a seat that circulated air through a seat assembly without either pulling or pushing air past a seat occupant.

The illustrated embodiments place the fan assembly 24 in the lower seat assembly 12. The invention can also be used in combination with a fan assembly installed in the seat back assembly 11. This could be accomplished with the gap 36 created by the noise cover 29 in fluid communication with a fan assembly installed in the seat back assembly 11. Alternatively, a noise cover could be attached to the seat back assembly 11 as shown in FIG. 5.

It should be appreciated that a noise cover in accordance with the invention could be installed as separate, individual layers. It should also be understood that the layers of the noise cover could be made into a laminated assembly prior to installation on a vehicle seat.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle seat assembly comprising:
   a lower seat assembly and a seat back assembly, at least one of the lower seat and seat back assemblies having a first exterior surface including body-side openings, a second exterior surface including one or more fan openings, and an interior region;
   a ventilation system including at least one fan configured to move air through the body-side openings and the one or more fan openings, the one or more fan openings providing fluid communication between the fan and an exterior of the seat assembly through the second exterior surface; and
   a flexible noise cover defining the one or more fan openings and forming the second exterior surface.

2. The vehicle seat assembly of claim 1, wherein the one or more fan openings are radially spaced from the axis of rotation of the fan.

3. The vehicle seat assembly of claim 1, wherein the flexible noise cover includes at least one relatively air impermeable layer forming the second exterior surface, and at least one relatively air permeable layer disposed between the fan and the one or more fan openings.

4. The vehicle seat assembly of claim 3, wherein the fan is disposed to move air into the interior region through the body-side openings and out from the interior region through the one or more fan openings.

5. The vehicle seat assembly of claim 3, wherein the one or more fan openings are radially spaced from the axis of rotation of the fan.

6. The vehicle seat assembly of claim 3, wherein the flexible noise cover includes a barrier layer, wherein the at least one relatively air permeable layer is disposed between the first relatively air impermeable layer and the barrier layer;
wherein the first relatively air impermeable layer defines the one or more fan openings and the barrier layer defines second openings; and
wherein the first relatively air impermeable layer and barrier layer and the relatively air permeable layer are configured to create an air flow path through the relatively air permeable layer.

7. The vehicle seat assembly of claim 6, wherein air moving to or from the one or more fan openings moves through a portion of the air permeable layer in a direction substantially parallel to the second exterior surface.

8. The vehicle seat assembly of claim 6, wherein the one or more fan openings are radially spaced from the axis of rotation of the fan.

9. A vehicle seat assembly comprising:
a lower seat assembly and a seat back assembly, at least one of the lower seat and seat back assemblies having a first exterior surface including body-side openings, a second exterior surface including one or more fan openings, and an interior region;
a ventilation system including at least one fan configured to move air through the body-side openings;
the one or more fan openings providing fluid communication between the fan and an exterior of the seat assembly through the second exterior surface; and
a noise cover comprising a first relatively air impermeable layer forming the second exterior surface, and at least one relatively air permeable layer, wherein the layers are a laminated assembly, and wherein the noise cover defines the one or more fan openings.

10. The vehicle seat assembly of claim 9, wherein the fan is disposed to move air into the interior region through the body-side openings and out from the interior region through the one or more fan openings.

11. The vehicle seat assembly of claim 9, wherein the one or more fan openings are radially spaced from the axis of rotation of the fan.

12. The vehicle seat assembly of claim 9, further including a barrier layer, wherein the at least one relatively air permeable layer is disposed between the first relatively air impermeable layer and the barrier layer;
wherein the first relatively air impermeable layer defines the one or more fan openings and the barrier layer defines second openings; and
wherein the first relatively air impermeable layer and barrier layer and the relatively air permeable layer are configured to create an air flow path through the relatively air permeable layer.

13. The vehicle seat assembly of claim 12, wherein the one or more fan openings are radially spaced from the axis of rotation of the fan.

14. The vehicle seat assembly of claim 12, wherein air moving to or from the one or more fan openings moves through a portion of the air permeable layer in a direction substantially parallel to the second exterior surface.

15. The vehicle seat assembly of claim 14, wherein the one or more fan openings are radially spaced from the axis of rotation of the fan.

16. The vehicle seat assembly of claim 14, wherein the one or more fan openings are larger than the second openings.

17. The vehicle seat assembly of claim 16, wherein the noise cover is flexible.

18. A ventilated seat assembly for a seat comprising:
a seat assembly including a first exterior surface, a second exterior surface, and an air path extending from the first exterior surface to the second exterior surface;
a fan provided within the seat assembly and disposed within the air path extending from the first exterior surface to the second exterior surface;
a first relatively air impermeable layer provided within the seat assembly and including a first opening that forms a first portion of the air path extending from the first exterior surface to the second exterior surface; and
a second relatively air impermeable layer provided within the seat assembly and including a second opening that forms a second portion of the air path extending from the first exterior surface to the second exterior surface that is subsequent to the first portion thereof, wherein the first and second openings are not aligned with one another.

19. The ventilated seat assembly defined in claim 18 further including a layer of a relatively air permeable material that is disposed in the air path between the first and second openings.

20. The ventilated seat assembly defined in claim 18 wherein the second relatively air impermeable layer is the second exterior surface of the seat assembly.

* * * * *